(12) United States Patent
Dahlen et al.

(10) Patent No.: US 8,810,137 B2
(45) Date of Patent: Aug. 19, 2014

(54) ILLUMINATION CONTROL SYSTEM FOR MOTION AND DAYLIGHT IN LARGE STRUCTURES

(75) Inventors: Kevin S Dahlen, Lindenhurst, IL (US); Jin K. Lee, Lake Villa, IL (US)

(73) Assignee: Kenall Manufacturing Company, Gurnee, IL (US)

( * ) Notice: Subject to any disclaimer, the term of this patent is extended or adjusted under 35 U.S.C. 154(b) by 851 days.

(21) Appl. No.: 12/972,229

(22) Filed: Dec. 17, 2010

(65) Prior Publication Data
US 2012/0153840 A1 Jun. 21, 2012

(51) Int. Cl.
*H05B 37/02* (2006.01)
(52) U.S. Cl.
USPC ........... 315/152; 315/291; 315/149; 315/150; 315/151
(58) Field of Classification Search
USPC .......... 315/149, 150, 151, 152, 153, 291, 312
See application file for complete search history.

(56) References Cited

U.S. PATENT DOCUMENTS

| | | | |
|---|---|---|---|
| 2010/0134046 A1* | 6/2010 | Holder et al. | 315/297 |
| 2010/0264846 A1* | 10/2010 | Chemel et al. | 315/294 |
| 2011/0057581 A1* | 3/2011 | Ashar et al. | 315/312 |
| 2012/0007511 A1* | 1/2012 | Choong et al. | 315/152 |

* cited by examiner

*Primary Examiner* — Douglas W Owens
*Assistant Examiner* — Jonathan Cooper
(74) *Attorney, Agent, or Firm* — Marshall, Gerstein & Borun LLP; Randall G. Rueth

(57) ABSTRACT

A cost effective illumination control system calculating motion and daylight or surrounding light inputs, particularly in large structures where the light distribution is not uniform across time. The system divides the structure into zones each having input capability with regard to occupation and background light levels. Each zone being able to make independent decisions with regard to control of lighting levels in the zone, yet the zones being able to cooperate in a coordinated fashion to provide uniform lighting to the structure as a whole.

10 Claims, 6 Drawing Sheets

| Occupancy | Background Light Level (LL) | Luminaire setting |
|---|---|---|
| Yes | LL<50% LL reference setting | 100% |
| No | 50%<LL<LL reference setting | User Defined |
| Yes | LL> LL reference setting | 5% |
| No | LL> LL reference setting | Off |
| Yes | 50% LL reference setting<LL<LL reference setting | User Defined |

ILLUMINATION CONTROL SYSTEM FOR MOTION AND DAYLIGHT IN LARGE STRUCTURES

CROSS REFERENCE TO RELATED APPLICATIONS

None.

FIELD OF THE INVENTION

The present invention relates to modular lighting systems and in particular a scalable system for controlling LED based luminaires in large structures having access to natural light with significant zones in shadow.

BACKGROUND OF THE INVENTION

Energy saving via controls is an area of interest in the lighting industry. More and more legislation is demanding that light fixtures be controlled when they are not in use by either lowering light levels or completely shutting off power to unneeded or redundant artificial light. In a sense this is no trivial task, as lighting, especially in public or commercial areas are quite closely tied with public and consumer utility and safety. People in modern society are becoming more accustomed to 'smart systems' that meet their unspoken and anticipated needs. They look for the technology to tailor to them and not the other way around.

On the other hand, the technology can come at a price. That price being more complex, expensive, and maintenance intensive systems. For example, many lighting systems today require complex human interaction, or computer monitoring, during set up and commissioning, which requires a person to check out the settings and adding to the overall cost of the system.

The present solution comprises a modular light emitting diode or LED system especially suited for large area structures having unequal lighting requirements throughout the day due to uneven access to natural light or changing lighting requirements throughout the day or night. The solution is modular having a choice of power supplies and control elements designed preferably to run at 320, 525, and 700 milliamps per module. As the system is modular and scalable, it is anticipated to divide the area of implementation into zones which can be controlled separately as needs and preferences require. The modules can be integrated together and scaled from a few luminaires to thousands of luminaires. In this case the term luminaire can be defined as a complete unit capable of providing light, or more simply a light with accompanying fixture.

In the prior art, occupancy sensors and ambient light sensors have been separate sensors having different functions and requiring different housings. Occupancy sensors are typically designed to detect changes in infrared signatures across a pattern of coverage in order to detect motion within a predefined area, a zone or a space. An ambient light sensor is typically less pattern and movement based and is used to detect ambient or background light coming from the surrounding environment, such as daylight. This can also include man made light coming from outside of the space of interest, also known as light pollution.

In a present embodiment it is preferred to combine the functionality of motion sensor such as a Wattstopper Legrand Sensor such as the Wattstopper FS-305 or a FS-355 occupancy sensor for example, with a high impedance background or ambient light sensor into one sensor housing. The separate signals can then be recorded and provided to the control module as desired from one integrated unit.

Having zonal control of both occupancy and ambient light that can work in a synchronous or coordinated fashion provides significant advantage over individual occupancy control of the prior art. For example a zone can be defined to comprise a level of a parking garage, or only part of that level. In prior art an occupant could enter the parking garage from the foot access stairwell, then have to move into proximity of say an elevator where the sensor may be located before the lighting is activated. It is not a preferred condition to have occupants activate the luminaires in a limited proximity as they walk towards their vehicle. The preferred methodology is for the occupant to not even be aware of the luminaire occupancy controls and that they can feel safe that the entire region comprising several zones be coordinated to act as one, yet by design be energy efficient to meet the needs of a green society. This can be achieved with zone control. Strategically placed sensors can be placed at all access points to each level and the entire floor will be activated from any location of entry yet modulated to accommodate the supplemental lighting requirements of each zone.

In another instance in a parking garage, it may not be recommended to dim-down the supplemental lighting when unoccupied in one zone or area, for example the first level of a parking garage, but the system could easily handle all other floors without occupants ever knowing the luminaires, which were previously dimmed, are activated upon occupancy of the specified level.

In another instance, consider a multilevel parking garage where areas of the garage may get significant daylight contributions during the day, yet others remain under deep shadow. A lighting control panel of the prior art would leave the light on across all zones regardless of daylight contribution, because the system is tied together without control by individual zone. Or in another instance require a complete computer system with integrated software to continuously monitor and decide between zones. When using a control module with zone control, the area can be evaluated and locations for sensors determined wherein individual zones of luminaires can be either dimmed or turned completely off depending upon input from a light level sensor when it detects ambient light contribution sufficient to make a change to the supplemental lighting level to the zone.

Sensitivity and levels can be user defined. A design parameter behind energy saving zone based occupancy control is to lower the light level when the space is not occupied according to predefined rules. The level of supplemental light can be adjusted to the appropriate application, building code, and desire of the end user. For example in a parking garage, RP-20 requires a minimum of 1 ft-candle average with a vertical average of 0.5 ft-candles at a level of 5 feet above the garage floor. It is quite common for specifications to require 5-10 ft-candles for the same space. With a user defined system the control module could provide 5-10 ft-candles when occupied, and dim to the RP-20 minimums when the space or zone is unoccupied.

A challenge particular to LED based luminaires is a degradation of luminosity over time. In other approaches such as defined by Papamichael et al. U.S. Pat. No. 7,781,713 B2, a method is advanced whereby the system adjusts the light level output of the lighting system based on a comparison of the output with a set point which then adjusts the present light level. A downside to this approach is that no feedback is given to a technician, for example, to intervene when the system needs servicing.

It is therefore an object of the invention to provide a supplemental lighting source which is energy efficient.

It is therefore an object of the invention to provide an energy efficient supplemental lighting source for commercial areas which is designed to reinforce public safety.

It is another object of the invention that this structure to provide improved a supplemental lighting source for commercial use which is scalable.

It is another object of the invention that this structure to provide improved a supplemental lighting source for commercial use which is cost effective.

It is another object of the invention that this structure to provide improved a supplemental lighting source for commercial use which requires little human interaction in the commissioning process.

It is another object of the invention that this structure to provide improved a supplemental lighting source for commercial use which comprises various zones of space operating in a synchronous fashion often associated with higher priced and more complex systems.

It is another object of the invention that this structure to provide improved a supplemental lighting source for commercial use which is retrofitable with prior systems.

It is another object of the invention that this structure to provide improved a supplemental lighting source for commercial use which integrates the functions of an occupancy sensor and a background light sensor.

It is another object of the invention that this structure to provide improved a supplemental lighting source for commercial use which provides feedback to a technician when significant LED degradation occurs.

BRIEF DESCRIPTION OF THE DRAWINGS

A complete understanding of the present invention may be obtained by reference to the accompanying drawings, when considered in conjunction with the subsequent, detailed description, in which.

DETAILED DESCRIPTION

Figure 1:
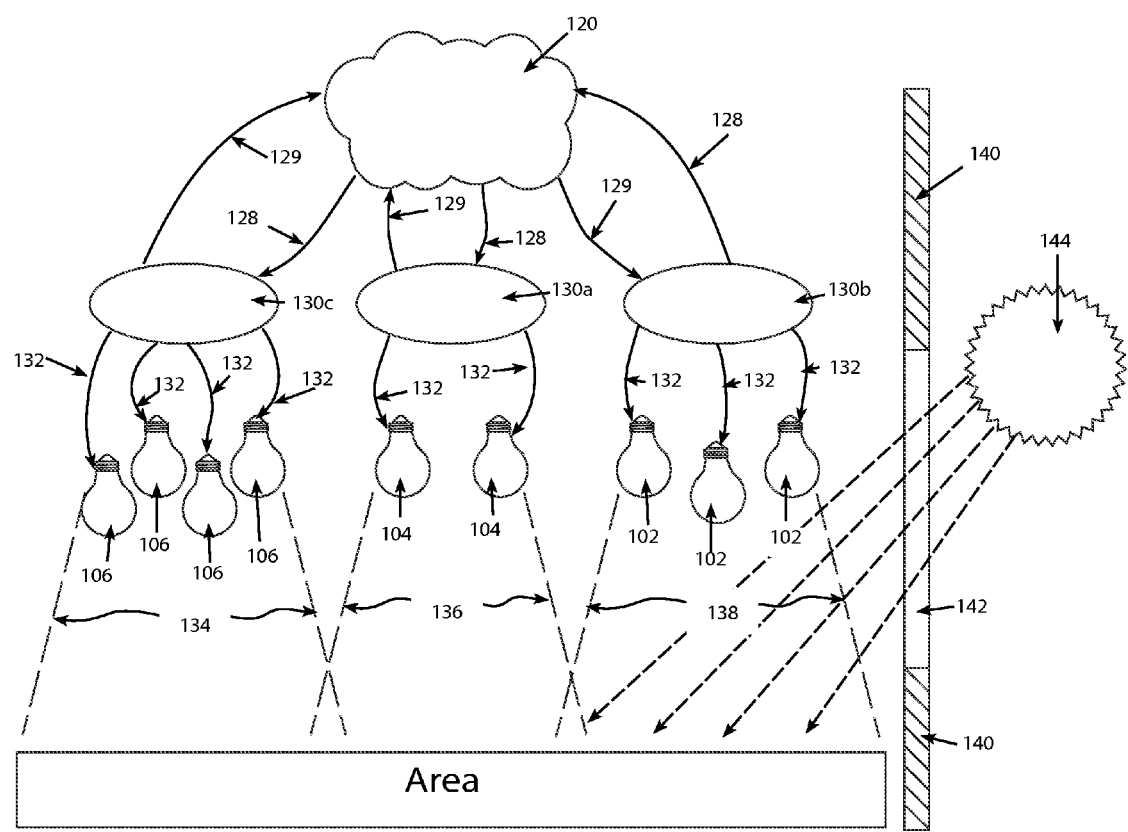
FIG. 1 is a schematic view of a typical implementation having daylight coming into one zone.
Figure 2:
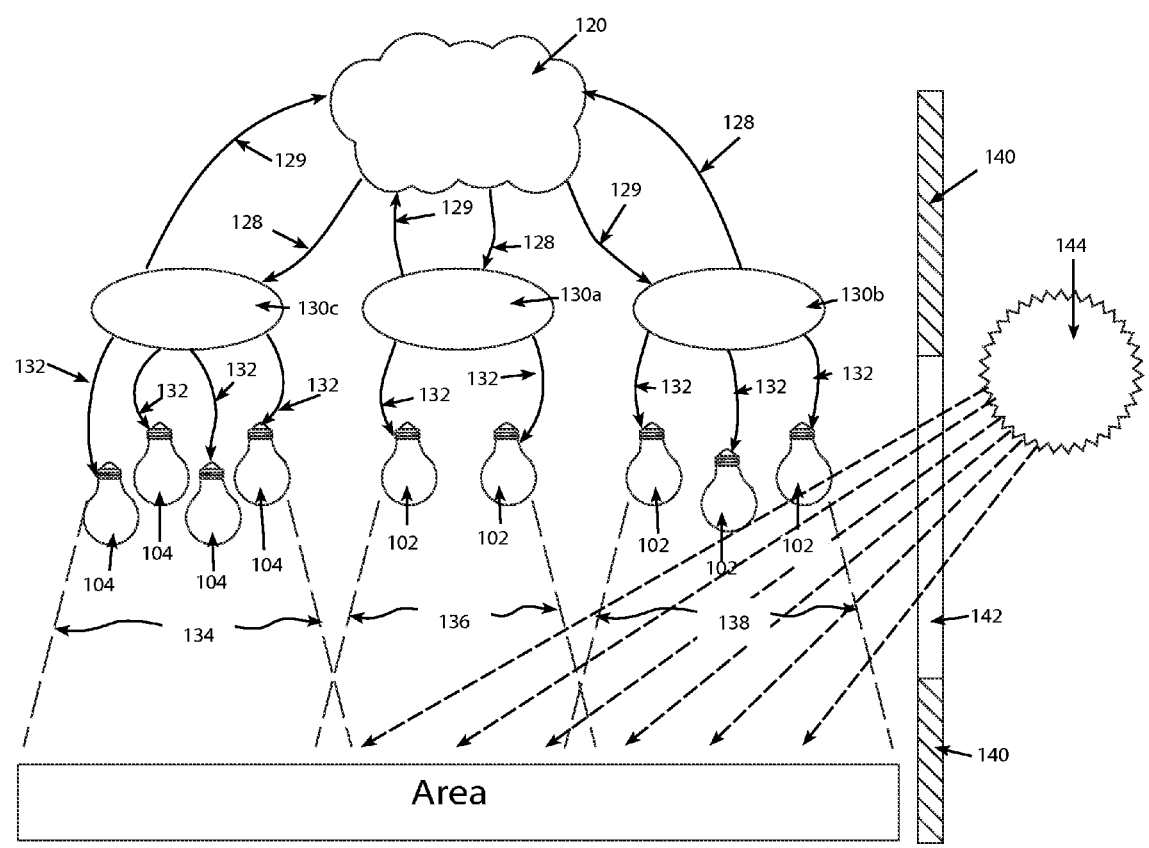
FIG. 2 is a schematic view of a typical implementation having daylight coming into two zones.
Figure 3:
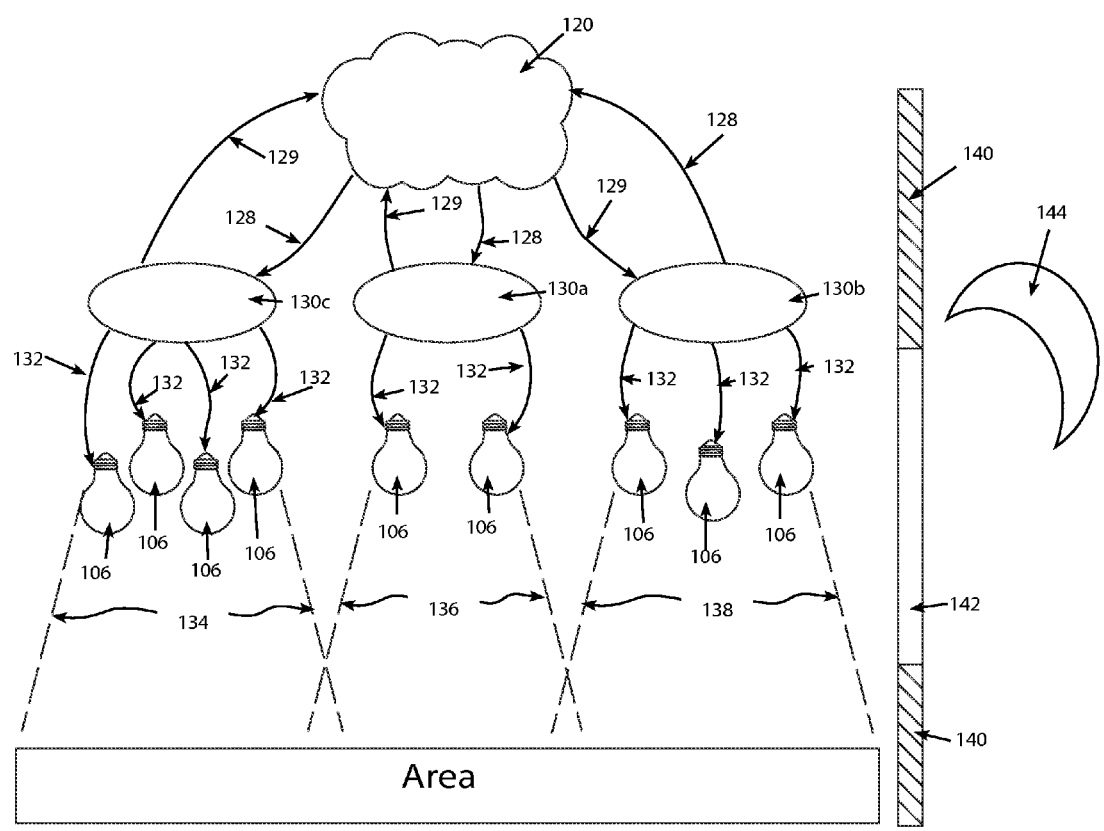
FIG. 3 is a schematic view of a typical implementation having nightlight coming into all zones.
Figure 4:
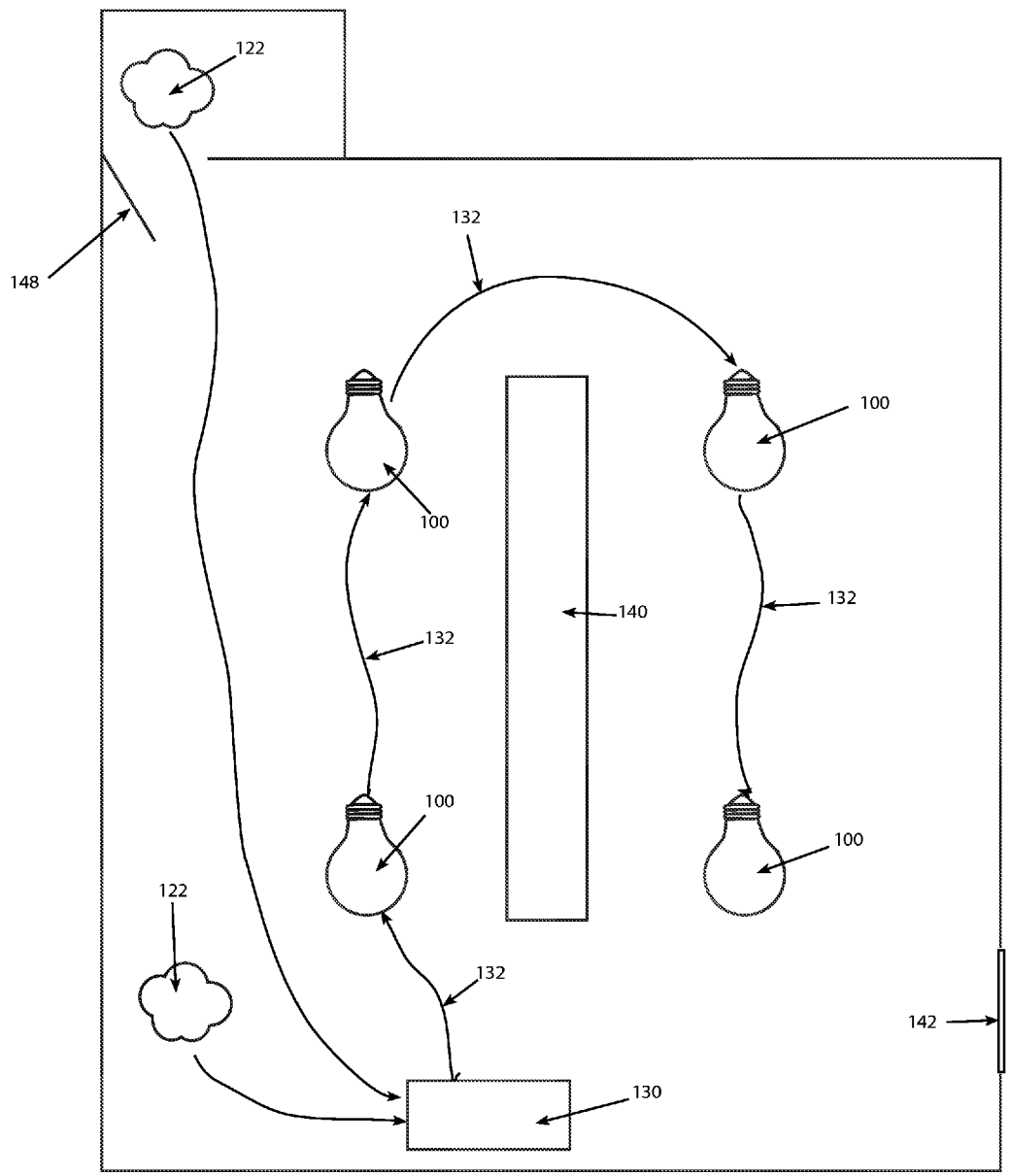
FIG. 4 is a schematic view of a prior art implementation having occupancy sensors.

Referring to FIGS. 1-3, an area which is exposed to daylight such as the sun (144) or natural light radiation, through a window (142) or other such opening, and is also at least partially shadowed by a wall (140) ceiling or other such enclosure, can have differing light levels depending upon the position of the sun (144). Such an area can be subdivided into zones, a first zone (134), a second zone (136), up to an nth zone (138) (which can be scaled completely) each zone having differing supplemental lighting needs at different times. Supplemental lighting can be defined as the amount of artificial light to be added to a zone sufficient to meet lighting a predefined specification or requirement.

Those skilled in the art will recognize that supplemental lighting levels can be controlled in a number of ways. For example luminaire(s) (100) can be controlled by means of an analog control having different voltage levels corresponding to different levels of light output. These levels can be user defined as an intermediate output state (104) between a fully ON high output state (106) and a fully OFF or low output state (102). In another preferred embodiment, an LED based luminaire is especially suited for control by digital means such as pulse width modulation or duty cycle loading.

In duty cycle loading for example, each zone (134) (136) (138) is in communication with at least one associated control module (130a) (130b) (130c). The associated control module (130a) (130b) (130c) provides a light level input (132) to luminaires (generally designated as (100). Using pulse width modulation, if a logic low is defined as an "OFF" state and a logic high is defined as an "ON" state, a series of logic high pulses of various durations can be provided to the luminaire at a frequency above that of human detection, preferably 100 KHz, to switch the light ON and OFF giving the perception of dimming of the light to an intermediate output state (104) between full ON and full OFF. The apparent brightness is then determined by the effective pulse width of the ON state relative to the OFF state.

Each control module (130) receives information through a grouping of associated sensors (120). In later Figures it will be seen that the grouping of sensors (120) can comprise at least one occupancy sensor (122) which can, for example, be an infrared based motion sensor, at least one light level sensor (124) which can, for example, sense background, ambient, daylight, or sunlight. Such sensors are known to those skilled in the art. Another sensor type, known here as a composite sensor (126), combines both the functions of an occupancy sensor (122) and a light level sensor (124). The grouping of sensors (120) receive power and communication by means of sensor inputs (129) and sensor outputs (128), which in this embodiment is preferred to be wired based connections, but can also be by wireless means without departing from the spirit of this invention.

Contrasting between FIGS. 1-3, during certain periods of time as shown in FIG. 1, the sun (144) may be in position to provide adequate natural light to zone n (138) such that no supplemental light is needed and the luminaires are set to a low state (102), while the second zone (136) receives some sunlight (144) yet require supplemental light which can be supplied by control module (130a) providing input to the luminaires to set an intermediate state (104), while yet another zone designated as a first zone (134) receives inadequate light to meet requirements such that a high requirement state or high state (106) including full supplemental light is needed.

As the day wears on, FIG. 2, the position of the sun (144) changes causing the amount of daylight in each of the zones (134) (136) 138) to change, in this instance resetting the luminaires associated with the second zone (136) to reset to a low state (102) and the first zone (134) to an intermediate state (104).

A can be seen in FIG. 2, as the day wears on each of the zones can self adjust in a coordinated and synchronous fashion. FIG. 3 shows a situation where the sun gone down and the natural lighting is provided by night light (146). Nightlight can include moon light, street lights, or other sources of light such as light pollution found in populated areas. Therefore, while all zones may be set to a high state (106), with sufficient night lighting (146) zone (130b) could reach some intermediate state (104).

Figures 6, 7:
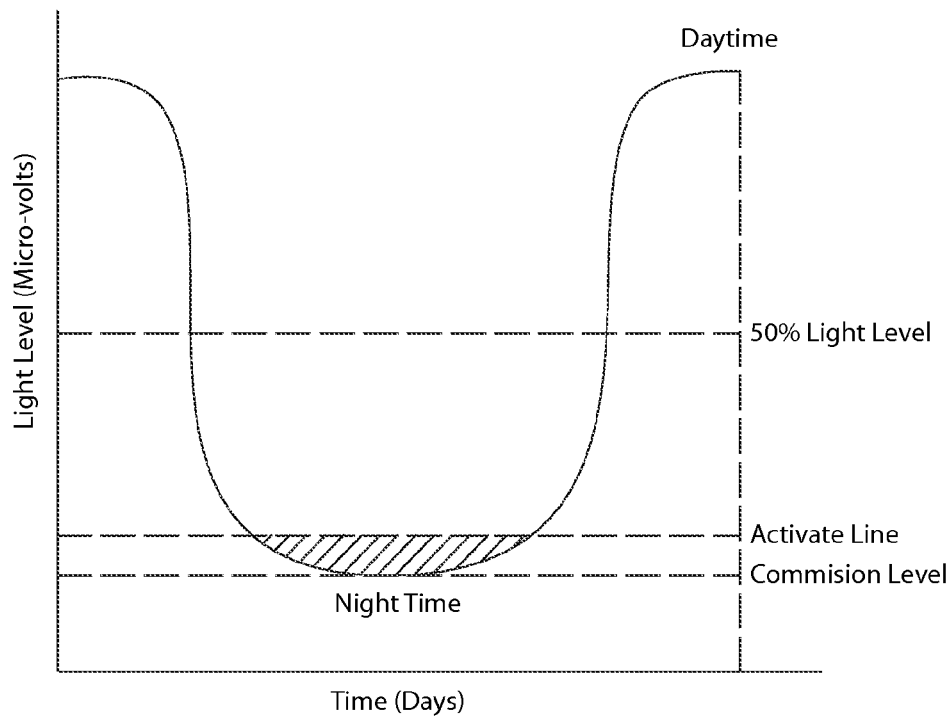
FIG. 6 is an exemplary diagram showing parameters useful for auto-commissioning and L(70) determination.
FIG. 7 is an exemplary logic table for determining settings of implementation across conditions of use for background light and occupancy.

Further context for the meanings to low state (102), intermediate state (104) and high state (106) can be understood when viewing the exemplary logic table provided in FIG. 7. Actual light level outputs (132) which determine the brightness of the luminaires (100) are controlled by two primary factors, background light levels the respective zone as received by a light level sensor (124) and occupancy as detected by an occupancy sensor (122). Luminaire settings are then tailored to these two inputs and adjusted as conditions change.

Figure 5:
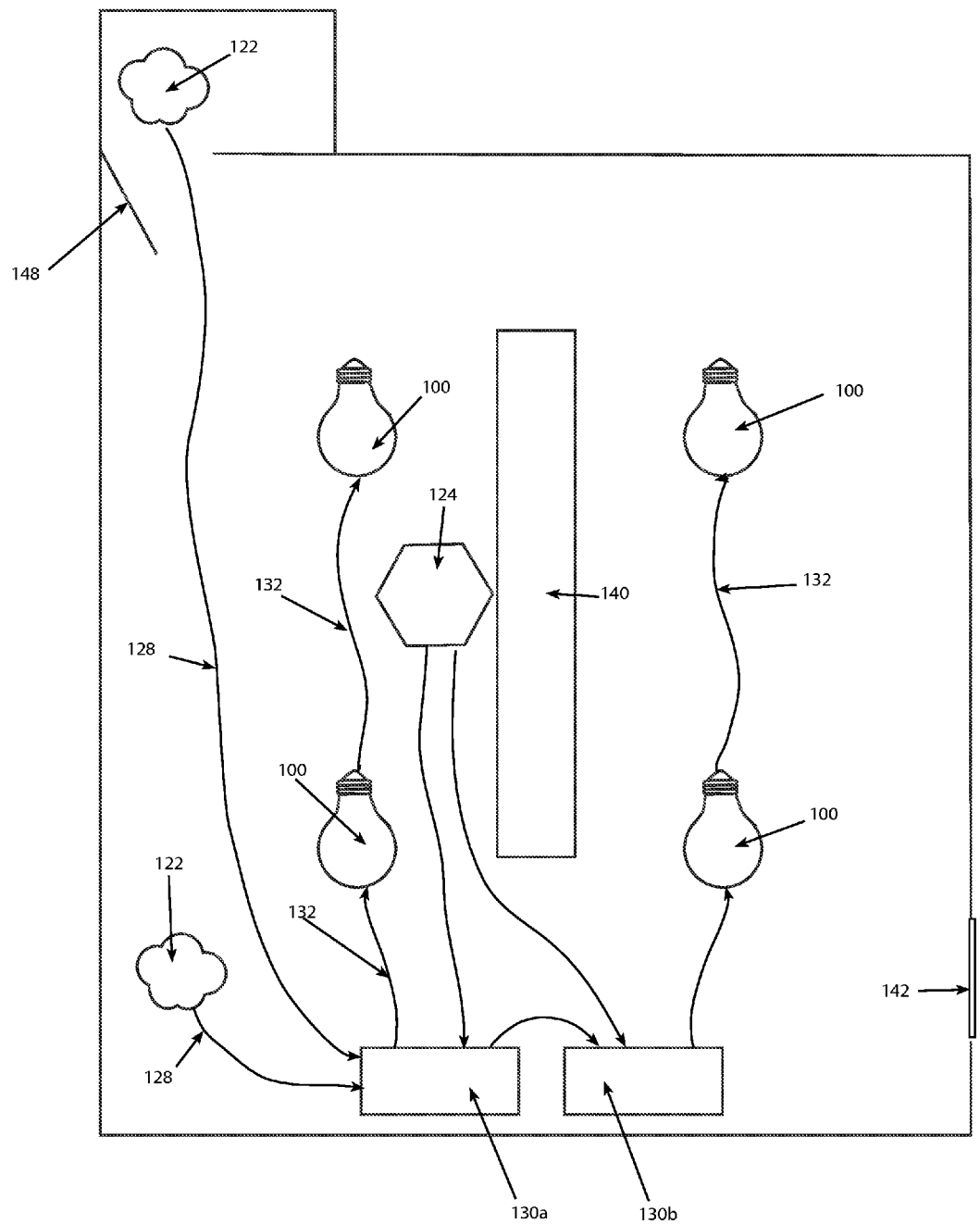
FIG. 5 is a schematic view of an alternate implementation having zonal control with light level sensor input.

FIG. 5 depicts an alternate embodiment of a structure having an interior wall (140) which blocks the natural lighting available through a window (142) and having a entry through a door (148). In this instance the area could be broken into to two zones having two control modules (130a) (130b) receiving input from two occupancy sensors (122) and one light level sensor (124) which is located in the zone being shadowed by the wall and providing input to both control modules (130a) (130b) by means of sensor output signals (128). The logic tables then being defined to accommodate the light level outputs (132) to the respective luminaires (100).

Referring to FIG. 6 a typical auto-commissioning procedure can be as follows. The system is installed and either 120V or 277V of power is applied to the control modules. The technician can then press a button on the module (130) which will disable all occupancy sensors for a sufficient period of time and all lights are driven at 100% of output for typically 24 hours. The control module will acquire frequent readings from the light level sensor every 2 to 3 minutes in order to determine the highest and lowest light level reading, which should correspond to daytime and nighttime.

Then during a specified time, roughly the first year of operation, the system will re-commission for 24 hours periodically, which can be every two months or so, in order to develop an L70 level. In a preferred embodiment, all six values will processed statistically to determine any abnormal results, which will be discarded from the long term memory. The lowest value of all the readings will be used to calculate an L70 level, which can be defined as a degeneration of 30% of the highest level of light output measured against the lowest background (also known as the commission level. If it is determined that the L70 value has been reached, an LED on the control module will be turned on indicating that technician interaction or evaluation is required.

CONCLUSION, RAMIFICATIONS, AND SCOPE

Although the present invention has been described in detail, those skilled in the art will understand that various changes, substitutions, and alterations herein may be made without departing from the spirit and scope of the invention in its broadest form. The invention is not considered limited to the example chosen for purposes of disclosure, and covers all changes and modifications which do not constitute departures from the true spirit and scope of this invention.

For example, although the foregoing refers to an LED based lighting system in a large area having differing lighting requirements according to time, it is contemplated that the for other uses and implementations. Further, details may vary from structure to structure in terms of dimensions, scaling, and exact position and type of sensors deployed, depending on the physical arrangement of the structural members.

Having thus described the invention, what is desired to be protected by Letters Patent is presented in the subsequent appended claims.

We claim:

1. A method for auto commissioning a light emitting diode (LED) lighting system to provide feedback to a technician when the LEDs require servicing; the technician providing a command to a control module causing:
   (i) the lighting system to turn on and remain on for a sufficient period of time;
   (ii) an algorithm to run a capture routine causing at least one light sensor to provide frequent readings of light levels from the lighting system to determine the lowest light level (lmin) over the sufficient period of time;
   (iii) the control module analyzing the readings to select and store the lowest level reading in a non volatile memory device;
   (iv) the algorithm setting a timer to repeat the capture routine at repeated intervals of time and, if a lower value for lmin is found, to replace the previously stored value in the non volatile memory device,
   (v) after the algorithm repeats the capture routine at repeated intervals for a specified time, the capture routines will stop, and the lowest value of lmin will remain in long term memory;
   (vi) periodically thereafter, the light level being measured and compared with lmin to determine if the system requires servicing and, if criteria are met, providing a signal to the technician.

2. The method in accordance with claim 1 wherein the sufficient period is 24 hours of time.

3. The method in accordance with claim 2 wherein the specified period is one year.

4. The method in accordance with claim 3 wherein the criteria for the system requiring servicing comprises a light level of between approximately 60% and 80% of lmin.

5. The method in accordance with claim 4 wherein the criteria for the system is substantially 70% of lmin.

6. The method in accordance with claim 5 comprising the further step of performing a statistical analysis for outlying data.

7. A system for illumination level control for supplementing natural lighting sources in a space that may be either occupied or unoccupied, the space being illuminable by both daylight and electric light, the system comprising: (i) a multiple of individual light emitting diode (LED) based luminaires comprising dimmable electric lights arranged into modules, each module providing lighting to a predefined space; (ii) each module in association with at least one occupancy sensor for sensing occupancy in at least a portion of said space; (iii) each occupancy sensor providing an occupancy signal; (iv) at least one ambient light sensor for sensing an illumination level in at least a portion of a predefined space and providing an ambient light signal, wherein the ambient light sensor takes intermediate readings during a delay period after the ambient light sensor senses a change in ambient light levels to ensure that the increase in ambient light is not transient in nature; (v) a control module having at least one first receiver for receiving a corresponding occupancy signal and at least one second receiver for receiving a daylight signal, and processing the occupancy signal and the ambient light signal according to predetermined conditions and driving an output value to a module of electric light to supplement the ambient lighting sources daylight illumination of the space.

8. The system in accordance with claim 7 wherein the ambient light sensor and the occupancy sensor are integrated into the same physical structure.

9. The system in accordance with claim 7 wherein the control system further comprises the occupancy sensor and the ambient light sensor are integrated electronically such that the ambient light sensor sets an initial light level upon an occupancy event which can be adjusted dynamically when the ambient light level changes without first going through an intervening period of unoccupancy.

10. The system in accordance with claim 7 wherein the delay comprises an interval of between 30 seconds and 30 minutes as ambient light levels increase.

* * * * *